United States Patent [19]

Kim

[11] Patent Number: 5,430,363
[45] Date of Patent: Jul. 4, 1995

[54] CHARGING DEVICE AND METHOD PERFORMING BATTERY ACTIVATION FUNCTION

[75] Inventor: Hee-Deok Kim, Seoul, Rep. of Korea

[73] Assignee: Samsung Electronics Co., Ltd., Suwon, Rep. of Korea

[21] Appl. No.: 997,087

[22] Filed: Dec. 29, 1992

[30] Foreign Application Priority Data

Nov. 27, 1992 [KR] Rep. of Korea .................. 22633/92

[51] Int. Cl.⁶ .................. H01M 10/44; H02J 7/04
[52] U.S. Cl. .................. 320/14; 320/31; 320/35
[58] Field of Search .................. 320/2, 14, 22, 31, 32, 320/35, 36

[56] References Cited

U.S. PATENT DOCUMENTS

| | | | |
|---|---|---|---|
| 3,500,167 | 3/1970 | Applegate et al. | 320/14 |
| 4,302,714 | 11/1981 | Yefsky | 320/14 X |
| 4,829,226 | 5/1989 | Nakamura et al. | 320/2 X |
| 5,130,634 | 7/1992 | Kasai | 320/22 |
| 5,159,258 | 10/1992 | Kolvites et al. | 320/14 |
| 5,248,927 | 9/1993 | Takei et al. | 320/2 |

*Primary Examiner*—Thomas M. Dougherty
*Assistant Examiner*—E. Tso
*Attorney, Agent, or Firm*—Robert E. Bushnell

[57] ABSTRACT

During charging, the present invention checks a charging state by checking a voltage and a temperature of charged battery, and after the completion of charging, it checks the voltage of battery after a predetermined time and activates the battery if the voltage is abnormal, so that the battery is fully charged. To do this, if the battery is newly inserted, first of all, a rapid charging operation is performed. And, it is checked whether charging blocking condition is generated in charging, and if not, charging operation is repeatedly performed. If a charging blocking condition is generated during charging however, a passage of charging current is blocked and the stand-by for a predetermined time is performed. At this time, in the stand-by step, to check whether the battery is normally charged, after completing the stand-by time, the charging voltage is checked, thereby checking the full-charging. If an abnormal voltage state is determined, charging power of the battery is discharged, and after standing-by for a predetermined time, charging operation is repeatedly performed. Accordingly, the non-activated battery is activated by automatically and repeatedly performing charging and discharging operation and then is fully charged.

23 Claims, 4 Drawing Sheets

CHARGING DEVICE AND METHOD PERFORMING BATTERY ACTIVATION FUNCTION

TECHNICAL FIELD

The present invention relates to a battery charging device and the method thereof, and more particularly to a device and method for activating a non-activated battery to a full charge.

BACKGROUND OF THE INVENTION

In contemporary designs of battery chargers, one or more batteries are subjected to nearly continuous recharging when not in use. For example, in the circuit of U.S. Pat. No. 5,130,634 describing a BATTERY CHARGER FOR A PORTABLE WIRELESS TELEPHONE SET HAVING MEANS FOR TRICKINGLY CHARGING THE BATTERY WITH AN INCREASED CURRENT DURING A STAND-BY PERIOD OF THE TELEPHONE SET, by Kasai, three different charging operations, each characterized by different charging currents, are used in an effort to maintain the battery pack at its normal charge amplitude despite current drain during standby operation. Generally however, when a rechargeable battery pack installed with a device is fully charged by a charging device, if the corresponding battery is a new and unused one, or has not been used for a long time, the maximum charge capacity can not be obtained. This is due to a chemical reaction of the battery, and occurs since the charging is being attempted with a corresponding battery which has not been fully charged, during charging. Also, the charging device typically performs a rapid charging operation, so that a charging operation is performed to place the battery in a fully charged state having a normal voltage within a short time.

In this case, the charging device senses the charged voltage state of the battery, and if the charging voltage is sensed as exceeding a predetermined voltage, full-charging is indicated. In case of a new battery or a battery unused for a long time however, since the corresponding battery is non-activated, full-charging is inaccurately indicated as described above without completion of maximum charging. Accordingly, when an insufficiently charged battery is used, the maximum charge capacity can not be obtained and a low capacity state appears, therefore, the battery has a very short discharging time in comparison to a battery having a maximum capacity, when the battery is inserted for use in an applied system.

Accordingly, when the non-activated battery has been charged as described above and is inserted for use in the applied system, the short discharging time causes repeated inconvenience.

SUMMARY OF THE INVENTION

Accordingly, it is an object of the present invention to provide an improved battery charger and an improved process for charging batteries.

It is yet another object to provide a device and method which can always fully charge a rechargeable battery.

It is another object of the present invention to provide a charging device and method which can fully charge a battery by activating a non-activated battery in a battery charging system.

It is still another object of the present invention to provide a method for detecting a voltage level and a temperature level of a battery being charged in a battery charging system, and repeatedly perform charging and discharging operations in a stable state of the battery, thereby activating the battery.

These and other objects may be achieved according to the principles of the present invention with a battery charging circuit and process for charging batteries connected to the circuit, a connector for electrically coupling the batteries to the circuit, a constant power source, a first switch for connecting the constant power source to the connector, a second switch and a load for discharging the battery via the second switch and the connector. A controller coupled to the battery via the connector monitors the charging of the battery and regulates the first and second switches to repeatedly charge and discharge the battery.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
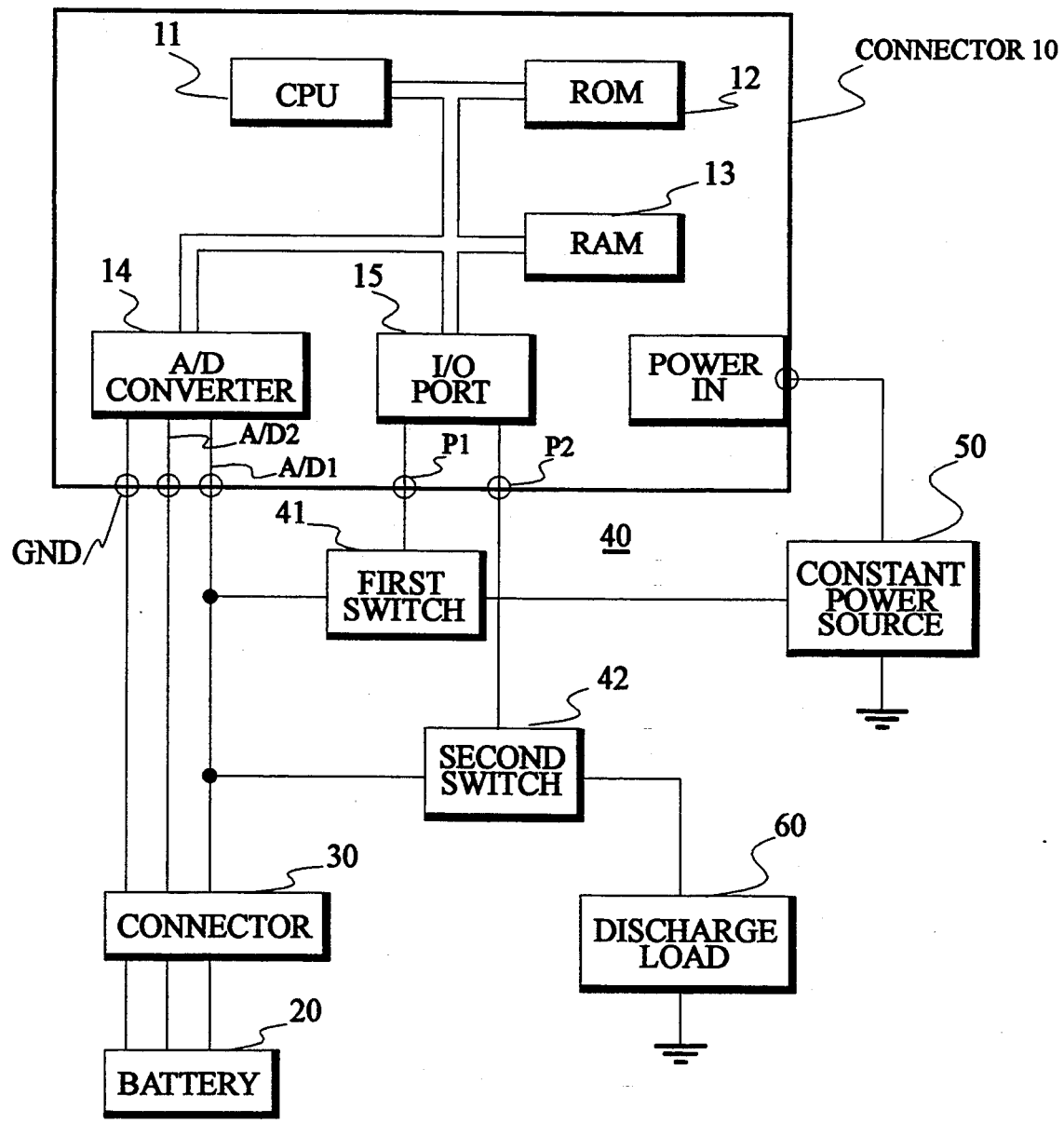
FIG. 1 is a block diagram of a charging device performing according to the principles the present invention.

Turning now to the drawings, FIG. 1 is a block diagram illustrating a charging device constructed according to the principles of the present invention, in which a control portion 10, formed by a 1-chip microprocessor, with a memory and an analog-to-digital (i.e., an "A/D") converter, etc., on the inside, controls the operation for activating and fully charging a non-activated battery. A battery pack 20 has a temperature sensor and performs a charging operation with the insertion of a battery. A connector 30 electrically couples the battery pack 20 and the control portion 10. A constant power source portion 50 generates a charging power source. A discharging load 60 enables a discharging passage of power charged from the battery pack 20. A first switch 41 in switching stage 40 is coupled between a voltage terminal of the connector 30 and the constant power source portion 50, and forms a passage for supplying a charging power source to battery pack 20 under the control of controller 10. A second switch 42 in the switching stage 40 is coupled between the voltage terminal of the connector 30 and the discharging load 60, and controls the discharging passage under control of the control portion 10.

Controller 10 uses a one-chip microprocessor as shown in FIG. 1. The microprocessor is formed by a CPU 11 that controls the entire operation of the charging device for activating a battery in a non-activated state that has been inserted into connector 30 to be fully charged. A ROM 12 stores an operation program of the charging device and a charging operation program while a RAM 13 performs a function for temporarily storing data generated during program performance under the control of CPU 11. An A/D converter 14 has input terminals coupled to the voltage terminal and a temperature terminal of connector 30. A/d converter 14 receives a charging voltage and a charging temperature generated from the battery from the voltage and temperature terminals, during charging, converts the received charging voltage and temperature into digital data, and then provides the digital data to CPU 11. An I/O port 15 of controller 10 has output terminals coupled to control terminals of first switch 41 and second switch 42, respectively, and respectively forms a charging passage and a discharging passage of the battery under the control of CPU 11.

Figure 2A:
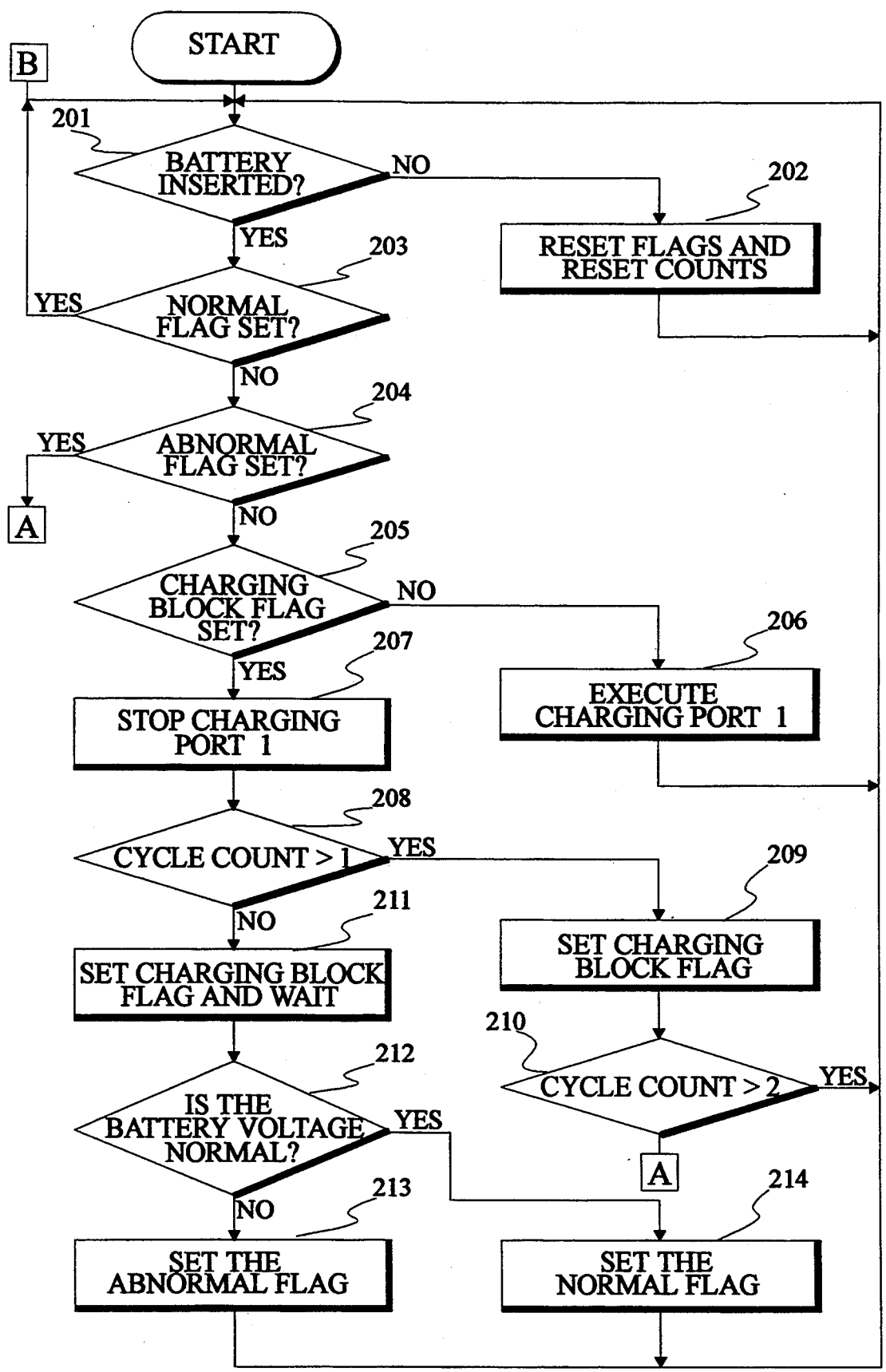
FIGS. 2A and 2B are flowcharts showing the charging according to the principles of the present invention.
Figure 2B:
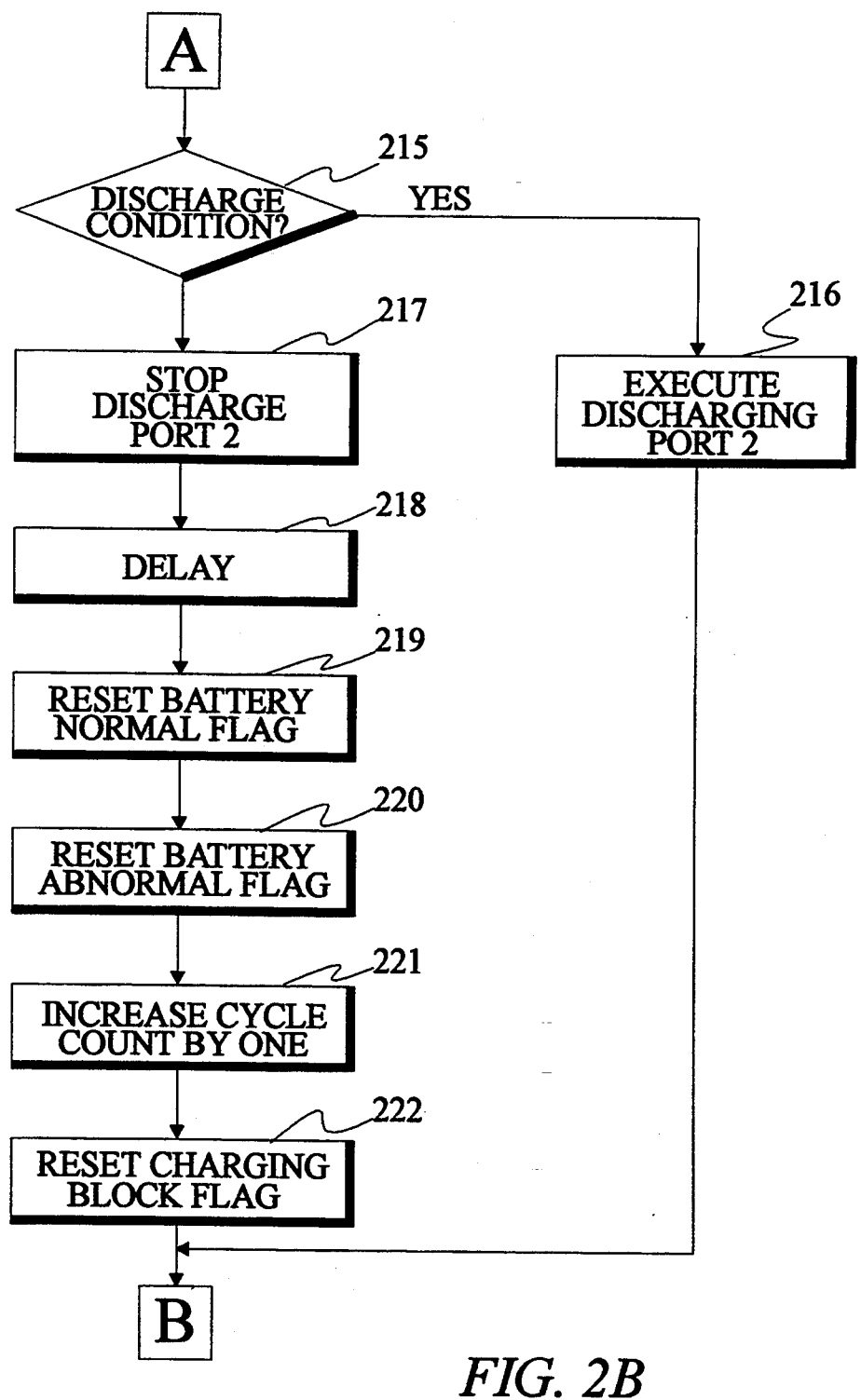

FIGS. 2A and 2B are flowcharts for a process for charging a battery using the circuit of FIG. 1 according to principles of the present invention. In this process, after a battery to be rapidly charged is inserted, the controller checks 10 to determine whether a charging block condition has been generated during the charging step, and repeatedly performs a charging operation on the batteries inserted if the charging block condition is not generated, but blocks a charging passage when the charging block condition is detected during charging and interrupts the charging operation for a predetermined time. The controller 10 gauges the achievement of a fully charged state by checking the voltage on the battery pack 20 after the interruption, discharges battery power if an abnormal state is detected during the voltage checking step and then stands by for a predetermined time; the charging operation is again initiated after standing by for a predetermined time.

Figure 3:
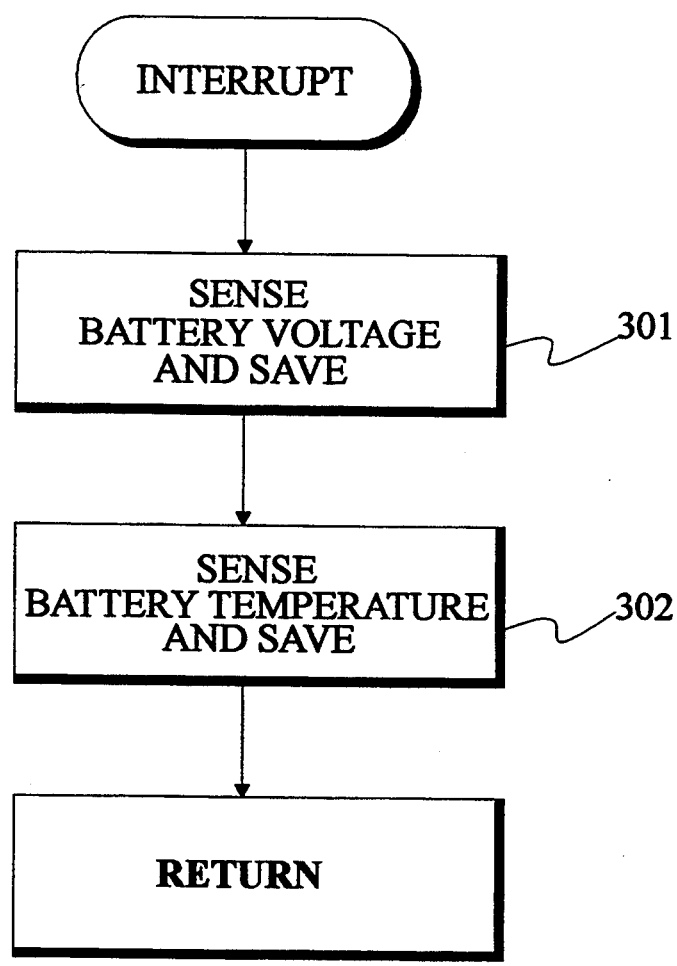
FIG. 3 is a flowchart showing an interrupt process according to principles of the present invention.

FIG. 3 shows a process for sensing charging voltage and charging temperature generated from the battery pack 20 in response to a timer interrupt signal generated according to constant period.

The present invention based on the above-mentioned constitution shown in FIG. 1 is described in even greater detail with reference to the flowcharts shown in FIGS. 2A, 2B and 3.

First in order, to activate and fully charge a new battery or a battery unused for a long time, the charging voltage and temperature of the battery should be monitored, and a constant power source be used to supply a charging current to the battery. An electrical load provides a discharging passage from the battery. During charging of the battery, the charging temperature and charging voltage of the battery are sensed to check whether the charging state is normal or abnormal. At this time, if an abnormal charging state is sensed, an operation for discharging the battery and then again charging the battery is repeatedly performed. If the charging and discharging operations are repeatedly performed as described, a battery in a non-activated state will be activated by being fully charged to a normal voltage and will consequently always have its maximum charging capacity.

To activate a non-activated battery by repeatedly performing the charging and discharging operations and thereby fully charging the battery as described above, CPU 11 periodically senses and monitors charging temperature and voltage of the battery through A/D converter 14. This is performed according to a timer interrupt as shown in FIG. 3, in which if a timer interrupt signal is generated each cycle, CPU 11 receives voltage and temperature data of the battery through the A/D converter 14 and stores those values in the RAM 13, at steps 301 and 302. Here, as is described above, the battery charging voltage and temperature of the battery pack 30 are read during each cycle and are stored in RAM 13, and then a return to interrupt is performed.

When the charging voltage and temperature of the battery are sensed in order to update values stored in RAM 13 as is described above, CPU 11 performs the procedure shown in FIGS. 2A and 2B, thereby controlling the circuit to enable the battery to be fully charged.

First CPU 11 checks at step 201 to determine whether a battery has been inserted by reading voltage and temperature data stored in RAM 13. That is, if a battery pack 30 has been inserted, A/D converter 14 reads the voltage and temperature generated by battery pack 30, and makes a determination according to the following Table 1.

TABLE 1

| Parameter | Condition for Standard Range | | Is Parameter Within Standard Range? | | | |
|---|---|---|---|---|---|---|
| | Voltage From Battery Pack (Input to A/D) | Digital Value in Hexadecimal (Output from A/D) | | | | |
| Battery Voltage | 0-10 V | $\leq FE_H$ | Yes | No | Yes | No |
| Battery Temperature | 3.5 V-2.2 V | $B2_H - 40_H$ | Yes | Yes | No | No |
| *CPU Determines By Reading Parameters Whether Battery Is Now Inserted: | | | Yes | No | No | No |

Accordingly, when the value of the battery voltage is detected as being below 10 V and the temperature value (indicated by a voltage) is within the range of 3.5 V-2.2 V, the battery is regarded as having been inserted. Accordingly, if controller 10 senses in step 201 that no battery has been inserted, CPU 11 goes to step 202 and resets all flags and counted values, and I/O port 15 is set to a low state. Accordingly, I/O port 15 supplies a low signal to first switch 41 and second switch 42, which accordingly are reset to a low (that is, an electrically open) state. Accordingly, the charging and discharge passages of the battery pack 30 are all blocked by being held in electrically non-conducting states.

If the battery pack 20 however, is coupled to the connector 30, and the battery insertion condition based on the Table 1 is satisfied, so that the insertion of a battery into holder 20 is sensed in step 201. CPU 11 then determines whether a normal battery flag has been set in step 203. At this time, if and the battery is newly coupled to connector 30, the respective flags have not been set, which is recognized in steps 203 to 205, a high signal is supplied to the first port P1 of the I/O port 15 in step 206. Then, the first switch 41 is turned on (i.e., switched to an electrically conducting state) and accordingly, the output of the constant power source portion 50 is supplied to the battery pack 20 through the connector 30. Accordingly, the battery performs a rapid charging operation using a rapidly charging power source such as that provided by constant power source portion 50.

While the charging operation is performed as described above, CPU 11 performs the operation shown in FIG. 3 so that the charging voltage and temperature of the battery are received through A/D converter 14 and are stored in the RAM 13. Accordingly, in the process shown in FIG. 3, at step 301, CPU 11 reads the voltage value and in step 302 the temperature value stored in RAM 13 as described above, and thereby checks the charging state of the battery. This is performed in step 205, by checking whether a charging block flag or a charging block condition is generated, thereby checking if charging is blocked If a charging block flag is set or a charging condition satisfied state is generated, the charging operation is blocked by opening first switch 41 to prevent electrical conduction between power source 50 and any batteries within holder 20. Otherwise, since CPU 11 repeatedly performs step 206 to turn on the first switch 41, the battery is continuously charged by the output of the constant power source portion 50.

In the charging condition determination of step 205 however, if −dV (where −dV is a decrement in charging voltage per unit charging time) or a temperature outside the charging block range is obtained, it is determined that the charging condition has not been satisfied. Here, when battery charging is completed, no more charging of the battery is performed, and then the battery voltage drops after a predetermined time elapses, thereby generating the −dV. The generation of −dV within the charging block range means that the battery is charged with a voltage substantially equal to the fully charged level.

Also, connector 30 comprises a temperature sensor. Accordingly, connector 30 senses, converts into a voltage value, and outputs the charging temperature generated in the battery during charging, while the battery pack 20 performs a charging operation by insertion of the battery. Accordingly, CPU 11 receives the charging temperature value of a battery through A/D converter 14 and checks that the charging temperature is normal. Here, the standard values of charging voltage and charging temperature are shown in the following Table 2.

TABLE 2

| Factor | Charging Incomplete Condition | |
| --- | --- | --- |
| | Actual Value | Digital Value in Hexadecimal |
| Charging Absolute Temperature | $\leq 50°$ C. | $\leq 60_H$ |
| Charging Time | $\leq 60$ min | $\leq 3C_H (= 60_D)$ |
| Decrement in Charging Voltage per Time (−dV) | $\leq 10$ mV (per cell) | $\leq 03_H$ |

The other conditions, except those conditions shown in the Table 2, are regarded as indicating that a battery exhibits a charging completed state.

Accordingly, when the above-described charging incomplete conditions set forth in Table 2 are not satisfied, the parameters considered indicate that the battery is exhibiting a charging completed state, and therefore the charging operation should be stopped. Accordingly, CPU 11 controls I/O port 15 to reset the first port P1 to a low state in step 207, thereby opening first switch 41. Then, the first switch 41 is turned off, and accordingly, the battery pack 20 does not receive charging current from the constant power source portion 50, thereby interrupting and preventing performance of the charging operation.

If the charging operation is stopped as described above, CPU 11 checks in step 208 whether the charging and discharging operation has previously been performed, and if not, it sets a charging block flag to stop the charging operation and stands by in a waiting state for a predetermined time in step 211. Accordingly, the charging device stands by for a predetermined time while the charging operation is blocked in step 211. While performing the stand-by step, with an activated battery, the charging voltage of the corresponding battery keeps a normal full-charging state, and while standing by with a non-activated battery, an abnormal state is indicated, so that the charging voltage of the battery drops.

After performing the stand-by step 211, CPU 11 receives a voltage value of the battery through the A/D converter 14 to check whether the voltage value indicating full-charging has been maintained. At this time, if the voltage value sensed from the battery has a normal charging completion voltage value, CPU 11 determines that an activated battery is charged, and then goes to step 214 to set a normal battery flag and then returns. If a normal charging voltage is not sensed in step 212 however, CPU 11 goes to step 213 to decide that a non-activated battery is charged and set an abnormal battery flag in step 213, and then returns. The above-described operation is shown in the following Table 3.

TABLE 3

| Flags | Voltage | Remarks |
| --- | --- | --- |
| Normal battery flag | greater than 6.8 V | Activated battery |
| Abnormal battery flag | smaller than 6.8 V | Non-activated battery |
| Charging blocking flag | full-charging state | Charging completion |

As described above, if battery pack 20 is newly connected to the connector 30, after performing a battery charging operation, CPU 11 determines whether the battery present in holder 20 is a normal battery or an abnormal battery by checking the charging voltage level in step 212 and, based on the determination, sets either an abnormal battery flag in step 213 or a normal battery flag in step 214.

At this time, if the battery is an activated one which has been used, a normal battery flag is set in step 214, and this is sensed in step 203, so that steps 201 to 203 are repeatedly performed. The operation described in the foregoing paragraphs is repeatedly performed until the battery pack 20 is detached from connector 30.

If the battery is a non-activated one however, an abnormal battery flag is set in step 213 and the CPU 11 recognizes it in step 204. In this case, since the battery in the battery pack 20 is either a new one or a battery unused for a long time, it is a non-activated battery, and accordingly, CPU 11 automatically repeats the charging and discharging operation to activate the battery.

First, when the charging and discharging operation is performed, CPU 11 checks whether the current state satisfies the discharging condition. And, in response to a determination that the discharging condition has been satisfied, the second port P2 of I/O port 15 is set to be high so as to discharge the voltage charged in the battery of the battery pack 20 in step 216. Next, the second switch 42 is turned on in response to a high signal supplied from the second port P2 of I/O port 15, thereby coupling the voltage terminal of the battery pack 20 and discharging load 60. Then, voltage charged in the battery is discharged through the discharging load. Accordingly, when the battery charging operation has been completed with a resulting non-activated state of the battery as described above, a discharging operation is performed in steps 215 and 216.

While the discharging operation is performed as described above, CPU 11 performs the steps shown in FIG. 3 to store the voltage of battery in the RAM 13 through the A/D converter 14, thereby checking the discharging voltage. CPU 11 accesses the voltage of the battery in step 215 and goes to step 217, thereby resetting the second port P2 of I/O port 15 if it is below a predetermined discharging standard voltage. Next, the second switch 42 is turned off, and accordingly, electrical conduction between the battery and discharging load 60 is blocked to stop the discharging operation. Then, CPU 11 stands by for a predetermined time in step 218. At this time, the reason for performing the stand-by step in step 218 is that the heat generated by overheating of the battery is dissipated. After stand-by step 218, steps 219 and 220 are performed respectively to reset the normal battery flag and the abnormal battery flag. This enables repetition of the charging operation the next time.

The discharging and charging cycle count is incremented in step 221 by one. Here, the charging and discharging cycle is performed for a predetermined number of times and the number of times needed to activate the non-activated battery is measured and stored in a charging and discharging cycle counter. In the present invention, it may be assumed that if the charging and discharging cycle is performed two times, the battery is activated. If the charging and discharging cycle is performed as described above, the charging and discharging cycle counted value is increased by one in step 221, and the charging block flag is cleared in step 222 to prepare for the next charging operation.

As described above, if charging and discharging is performed, the normal battery flag, the abnormal battery flag and the charging block flag are all reset in steps 219, 220 and 222, respectively. Accordingly, the charging and discharging operation is completed, which is recognized in steps 203 to 205, and the first port P1 of the I/O port 15 is set to be high to close second switch 41 and thereby again perform a charging operation in step 206. Accordingly, the first switch 41 is turned on to supply the output of the constant power source portion 50 to the battery pack 20 as a charging power source. Thus, the battery pack 20 again performs the charging operation.

During the above-described charging operation, if a charging completion condition is generated, CPU 11 recognizes the generation of the charging completion condition in step 205, and resets the first port P1 of I/O port 15 to be low, thereby turning off (i.e., opening) first switch 41. Accordingly, the output of constant power source 50 is blocked, so that the battery stops receiving a charge. At this time, since a count of the number of charging and discharging cycles exists in the charging and discharging cycle counter, CPU 11 recognizes the value of the count in step 208, sets a charging blocking flag in step 209, and checks the value of the charging and discharging cycle counter in step 210. At this time, if the value of the count held by the charging and discharging cycle counter is equal to two or more, CPU 11 determines that a normal charging operation is performed by activating the battery, and then returns to the beginning of the process.

If in step 210 it is determined that the charging and discharging cycle has been performed less than two times however, step 215 is performed to carry out a discharging operation. Then, after performing the discharging operation as described above, the steps of standing-by (i.e, waiting) for a predetermined time and again performing the charging operation are again repeatedly performed.

Accordingly, when the charging operation is performed with the insertion of a battery in holder 20, if the activated battery in use is inserted, the charging operation is performed once, thereby completing the charging. If the battery is either newly used or has not been used for a long time however, it is in a non-activated state, so that the charging operation is automatically performed until it is activated, and then is completed as being fully charged to a normal voltage.

In present invention, a method for repeating charging and discharging operation for a predetermined number of times to activate the non-activated battery is used. With this method, while the charging and discharging operation is repeatedly performed, the voltage during charging is kept at a normal voltage over a predetermined time, and full-charging is performed.

As described above, in a device constructed and operated according to the foregoing principles for charging a rechargeable battery, either a newly used battery or a battery unused for a long time will initially be in a non-activated state, and accordingly, will have difficulty in becoming fully charged. To activate such a non-activated battery, in the present invention, during charging, the battery is checked to determine whether the charged voltage is maintained for a predetermined time at a normal voltage level after the completion of charging. At this time, if a normal voltage is not kept, the battery is regarded as a non-activated battery, which is activated by automatically and repeatedly performing the battery charging and discharging operation in order to obtain a maximum charging capacity. Accordingly, while the charging and discharging operation is repeatedly performed as described above, the battery is activated and becomes a normal battery, and accordingly, always attains a maximum charging capacity regardless of the initial condition of the battery.

What is claimed is:

1. A battery charging device, comprising:
    means for electrically connecting a chargeable battery to said battery charging device;
    means for discharging the battery;
    power source means for generating a source of power for charging the battery;
    a first switch electrically coupled between said power source means and the battery;
    a second switch electrically coupled between said discharging means and the battery;
    digital conversion means coupled to the battery for generating digital signals representative of a charging voltage of the battery and a temperature of the battery; and
    control means for controlling said battery charging device, said control means sequentially enabling charging of the battery by switching said first switch to electrically connect the battery to said power source means until a first to occur of a rate of change of the charging voltage is below a predetermined level and the temperature of the battery is above a predetermined temperature, interrupting said charging of the battery by said power source means for a predetermined time, analyzing an output of said digital conversion means, enabling discharging of the battery by switching said second switch to electrically connect the battery to said discharging means when said output of said digital conversion means indicates that the charging voltage of the battery is below a threshold level, increasing a count value indicative of a number of charge-discharge cycles performed, repeating said charging and discharging of the battery until a first to occur of the charging voltage of the battery is greater than or equal to said threshold level and said number of said charge-discharge cycles equals two, then removing the battery in a fully-charged state from said battery charging device.

2. A battery charging device, comprising:
means for electrically connecting a battery to the battery charging device;
means for discharging the battery;
power source means for generating a source of power for charging the battery;
a first switch electrically coupled between said power source means and the battery;
a second switch electrically coupled between said discharging means and the battery;
means coupled to the battery for generating first digital data representative of a magnitude of voltage held by the battery during charging of the battery;
means for sensing a temperature of the battery;
means for generating second digital data representative of said temperature of the battery during said charging;
control means for controlling the battery charging device, said control means sequentially enabling said charging of the battery by operating said first switch to electrically connect said power source means to the battery, analyzing said first and second digital data during said charging, determining that a charging completion state exists if one of said first digital data indicates that a rate of change of the magnitude of voltage held by the battery is below a predetermined level and said second digital data indicates that the temperature of the battery is above a predetermined temperature, turning off said first switch to stop said charging of the battery and then waiting for a predetermined period of time when said charging completion state exists, analyzing said first digital data, enabling discharging of the battery by operating said second switch to electrically connect the battery to said discharging means when said first digital data indicates that the magnitude of voltage held by the battery is below a threshold level, increasing a count value indicative of a number of charge-discharge cycles performed, and repeating said charging and discharging of the battery until a first to occur of the magnitude of voltage held by the battery is greater than or equal to said threshold level and said number of said charge-discharge cycles equals two, the battery then being in a fully-charged state.

3. A battery charging method, comprising the steps of:
rapidly charging a battery when the battery is inserted into a battery charging device;
checking whether a charging block condition is generated during said charging step, and repeatedly performing said charging step if the charging block condition is not generated;
blocking a charging passage when the charging block condition is generated during said charging step, and then standing by for a first predetermined time period;
checking for a full-charging state by checking a charging voltage of the battery after standing-by for said first predetermined time period;
discharging said battery if said charging voltage of the battery is below a threshold voltage during said step of checking for said full-charging state, standing by for a second predetermined time period, increasing a count value indicative of a number of charge-discharge cycles performed, and repeating said charging and discharging of the battery until a first to occur of said charging voltage of the battery is greater than or equal to said threshold voltage and said number of said charge-discharge cycles equals two, the battery then being in a fully-charged state.

4. A battery charging method as claimed in claim 3, wherein said charging passage blocking step comprises the steps of:
receiving a charging temperature of the battery and setting said charging block condition when said charging temperature exceeds a predetermined temperature;
receiving said charging voltage of the battery and setting said charging block condition when a rate of change of said charging voltage below a predetermined level is sensed; and
stopping said charging of the battery by blocking charging current supplied to the battery when said charging block condition is sensed.

5. A battery charging method as claimed in claim 4, wherein said charging block condition is not generated when the battery has been charged for one hour or less.

6. A battery charging method, comprising the steps of:
rapidly charging a battery when the battery is inserted into a battery charging device;
checking whether a charging block condition is generated during said charging step, and repeatedly performing said charging step if the charging block condition is not generated;
blocking a charging passage when said charging block condition is generated in said charging step;
checking how many cycles of charging and discharging have been performed, after blocking said charging passage;
standing-by for a first predetermined time period after said step of checking how many cycles of charging and discharging have been performed;
checking for a full-charging state of the battery by checking a charging voltage of the battery after said standing-by step;
discharging the battery if said charging voltage of the battery is below a threshold voltage in said full-charging checking step, standing-by for a second predetermined time period, then increasing a charging and discharging counted value indicative of how many said cycles of charging and discharging have been performed; and
repeating said charging and discharging steps until a first to occur of said charging and discharging counted value equals two and said charging voltage of the battery is greater than or equal to said threshold voltage, thereby activating the battery to be fully charged.

7. A battery charging method as claimed in claim 6, wherein said charging passage blocking step comprises the steps of:
  receiving a charging temperature of the battery and setting said charging block condition when said charging temperature exceeds a predetermined temperature;
  receiving said charging voltage of the battery and setting said charging block condition when a rate of change of said charging voltage below a predetermined level is sensed; and
  stopping said charging of the battery by blocking charging current supplied to the battery when said charging block condition is sensed.

8. A battery charging and activating device for charging and activating batteries, comprising:
  battery pack means for receiving at least one battery inserted therein, the battery pack means comprising a temperature sensor for sensing battery temperature;
  constant power source means for providing the battery charging and activating device with a constant power source;
  discharging means for discharging power from the battery;
  first switch means coupled between said battery pack means and said constant power source means, for selectively passing, in response to a first control signal, said constant power source from said constant power source means to the battery inserted in said battery pack means for charging the battery;
  second switch means coupled between said battery pack means and said discharging means, for selectively passing, in response to a second control signal, power from the battery inserted in said battery pack means to said discharging means for discharging the battery; and
  control means, responsive to a temperature value of the battery inserted in said battery pack means and to a voltage level of the battery, for providing one of said first control signal and said second control signal to said first switch means and said second switch means, respectively, said control means sequentially enabling charging of the battery, entering a stand-by state for a predetermined time, analyzing said voltage level of the battery, enabling discharging of the battery when said voltage level of the battery is below a threshold voltage, increasing a count value indicative of a number of charge-discharge cycles performed, and repeating said charging and discharging of the battery until a first to occur of said voltage level of the battery is greater than or equal to said threshold voltage and said number of said charge-discharge cycles equals two, the battery then being in a fully-charged state.

9. The battery charging and activating device as claimed in claim 8, wherein said battery pack means further comprises:
  a connector for providing a first connection between a ground terminal of said control means and the battery inserted in said battery pack means, a second connection between said temperature sensor and said control means, and a third connection between said first switch means and said battery.

10. The battery charging and activating device as claimed in claim 9 wherein said third connection is further provided between the battery and said second switch means.

11. The battery charging and activating device as claimed in claim 9, wherein said control means comprises:
  analog-to-digital conversion means connected to said first, second and third connections, for converting received analog values representative of said temperature value and said voltage level of the battery, to digital data; and
  a central processing unit for receiving said digital data and storing said digital data in a memory, said central processing unit reading said digital data stored in said memory for determining whether the battery has been inserted into said battery pack means.

12. The battery charging and activating device as claimed in claim 10, wherein said control means comprises:
  an analog-to-digital converter connected to said first, second and third connections, for converting received analog values representative of said temperature value and said voltage level of the battery, to digital data; and
  a central processing unit for receiving said digital data and storing said digital data in a memory, said central processing unit reading said digital data stored in said memory for determining whether said battery has been inserted in said battery pack means.

13. The battery charging and activating device as claimed in claim 8, wherein said control means comprises:
  an analog-to-digital converter for receiving said temperature value of the battery from said temperature sensor and for converting said temperature value to a first digital signal;
  said analog-to-digital converter being connected for receiving said voltage level of the battery and for converting said voltage level to a second digital signal;
  a memory; and
  a central processing means for receiving said first and second digital signals, storing said first and second digital signals in said memory and reading said first and second digital signals stored in said memory to determine whether said battery has been inserted into said battery pack means.

14. The battery charging and activating device as claimed in claim 13, wherein, once the battery has been determined to have been inserted into said battery pack means, said central processing means provides said first control signal to said first switch means to enable said constant power source to rapidly charge the battery, and said control means senses said temperature value and said voltage level of the battery during charging.

15. The battery charging and activating device as claimed in claim 14, wherein during charging, said central processing means determines from said temperature value and said voltage level of the battery, whether a charging condition of the battery is one of an abnormal charging condition and a normal charging condition, and said central processing means ceases to provide said first control signal to said first switch means upon determination of said abnormal charging condition and provides said second control signal to said second switch means to discharge the battery through said discharging means.

16. The battery charging and activating device as claimed in claim 14, wherein during charging, said central processing means determines whether a condition for blocking the charging of the battery has been met, said condition for blocking being one of a predetermined decrease in said voltage level of the battery over a predetermined time and an increase in said temperature value of the battery above a predetermined temperature, said central processing means controlling said first switch means to disable the charging of the battery when one of said conditions for blocking has been determined to exist.

17. The battery charging and activating device as claimed in claim 16, wherein after said first switch means has been controlled to disable the charging of the battery, said central processing means checks said count value to determine whether said charge-discharge cycle has been performed at least once, said central processing means setting a charging block flag and entering said stand-by state for said predetermined time after determining that said charge-discharge cycle has not been performed at least once, said control means then sensing said voltage level of the battery after said stand-by state.

18. The battery charging and activating device as claimed in claim 17, wherein after said stand-by state, said central processing means determines whether said voltage level of the battery has maintained a predetermined voltage level during said stand-by state, sets a normal flag if said predetermined voltage level has been maintained and sets an abnormal flag if said predetermined voltage level has not been maintained, said normal flag being indicative of an activated battery and said abnormal flag being indicative of a non-activated battery.

19. The battery charging and activating device as claimed in claim 18, wherein if said abnormal flag has been set, said central processing means controls said second switch means to enable the battery to be discharged through said discharging means.

20. The battery charging and activating device as claimed in claim 19, wherein during discharging, said central processing means controls said second switch means to prevent said discharging means from further discharging the battery if said voltage level of the battery is below a predetermined discharging voltage, said central processing means then sequentially resetting said normal and abnormal flags after a predetermined delay period, increasing said count value by one, resetting said charging block flag and again determining whether said battery has been inserted into said battery pack means, said first switch means being controlled to enable the battery to be charged again if said abnormal, normal and charging block flags have not been set.

21. A method for charging a battery inserted into a battery pack of a battery charging and activating device, said method comprising the steps of:
storing, in memory, digital data representative of a battery temperature and a battery voltage and determining, in response to said digital data, whether the battery has been inserted into said battery pack;
charging the battery when said step of determining has indicated that the battery has been inserted into said battery pack;
checking, during said charging step, a charging state of the battery and discharging the battery if said charging state is indicative of an abnormal charging operation;
determining if said battery voltage has decreased a given amount within a predetermined time or if said battery temperature is above a predetermined level, and blocking said charging step if said battery voltage has decreased said given amount within said predetermined time or if said battery temperature is above said predetermined level;
determining after said blocking step, whether a charging and discharging cycle has been performed at least once;
setting a charging block flag if said charging and discharging cycle has been performed at least once and then determining whether said charging and discharging cycle has been performed at least twice; and
returning to said step of determining whether the battery has been inserted into said battery pack if said charging and discharging cycle has been performed at least twice, and discharging said battery if said charging and discharging cycle has not been performed at least twice.

22. The method as claimed in claim 21, further comprising the steps of:
setting said charging block flag and entering a stand-by state for a predetermined stand-by time period if said charging and discharging cycle has not been performed at least once;
sensing said battery voltage and determining whether said battery voltage is at least equal to a predetermined full charge voltage, after said predetermined stand-by time period; and
setting an abnormal flag, indicative of a non-activated state of the battery, if said battery voltage is less than said predetermined full charge voltage and setting a normal flag, indicative of an activated state of said battery, if said battery voltage is at least equal to said predetermined full charge voltage.

23. The method as claimed in claim 22, further comprising the steps of:
determining, after said abnormal flag has been set, if said battery voltage is below a predetermined discharge voltage;
stopping the battery from being discharged if said battery voltage is below said predetermined discharge voltage;
discharging the battery if said battery voltage is not below said predetermined discharge voltage and again determining if said battery voltage is below said predetermined discharge voltage;
waiting for a predetermined delay period to allow the battery to cool, after said stopping step;
resetting all previously set flags; and
returning to said step of determining whether the battery has been inserted into said battery pack.

* * * * *